United States Patent
Zuydervelt et al.

(10) Patent No.: US 10,638,173 B2
(45) Date of Patent: *Apr. 28, 2020

(54) METHOD AND APPARATUS FOR SESSION-BASED WATERMARKING OF STREAMED CONTENT

(71) Applicant: IRDETO B.V., Hoofddorp (NL)

(72) Inventors: Lau Zuydervelt, Hoofddorp (NL); Vladimir Živković, Hoofddorp (NL); Maksym Koshel, Hoofddorp (NL); Lucas Catranis, Hoofddorp (NL)

(73) Assignee: IRDETO B.V., Hoofddorp (NL)

( * ) Notice: Subject to any disclaimer, the term of this patent is extended or adjusted under 35 U.S.C. 154(b) by 295 days.

This patent is subject to a terminal disclaimer.

(21) Appl. No.: 15/887,991

(22) Filed: Feb. 3, 2018

(65) Prior Publication Data
US 2019/0246152 A1    Aug. 8, 2019

(51) Int. Cl.
*H04N 7/167*    (2011.01)
*H04N 21/2389*    (2011.01)
(Continued)

(52) U.S. Cl.
CPC ..... *H04N 21/23892* (2013.01); *H04N 21/236* (2013.01); *H04N 21/238* (2013.01); *H04N 21/6377* (2013.01); *H04N 21/8352* (2013.01); *H04N 21/8358* (2013.01); *H04N 21/8456* (2013.01)

(58) Field of Classification Search
CPC ......... H04N 21/8358; H04N 21/23892; H04N 1/32352; H04N 21/8456; H04N 21/4622; H04N 21/8586; H04N 1/32299; H04N 1/32304; H04N 21/6581; H04N 21/26258;
(Continued)

(56) References Cited

U.S. PATENT DOCUMENTS 7,054,955 B2 *  5/2006  Chen ............... G06F 16/27
                                          709/248
7,058,809 B2    6/2006  White et al.
(Continued)

FOREIGN PATENT DOCUMENTS

EP    2 843 963 A1    3/2015

OTHER PUBLICATIONS

International Search Report and Written Opinion received for PCT Application Serial No. PCT/IB2019/050782 dated Apr. 24, 2019, 11 pages.
(Continued)

*Primary Examiner* — Jason Salce
(74) *Attorney, Agent, or Firm* — Rimon PC; Marc Kaufman

(57) ABSTRACT

Watermarking of a content stream is accomplished in a session based manner to provide watermarking based on a uniquely generated manifest that will result in a stream that allows for unique identification of information. The manifest specifies a sequence of watermarks for successive segments of a content stream designated for a specific receiver. The system and method leverages existing content distribution infrastructure and has many of the benefits of conventional head-end watermarking, allows unique identification of small segments of the data stream and reduces content distribution network storage requirements.

21 Claims, 3 Drawing Sheets

(51) Int. Cl.
*H04N 21/845* (2011.01)
*H04N 21/6377* (2011.01)
*H04N 21/236* (2011.01)
*H04N 21/238* (2011.01)
*H04N 21/8352* (2011.01)
*H04N 21/8358* (2011.01)

(58) Field of Classification Search
CPC .. H04N 21/4627; G06T 1/0021; G06T 1/0071
See application file for complete search history.

(56) References Cited

U.S. PATENT DOCUMENTS

| | | | |
|---|---|---|---|
| 9,288,057 | B2 | 3/2016 | Jarnikov |
| 2011/0286625 | A1 | 11/2011 | Petrovic et al. |
| 2013/0166868 | A1* | 6/2013 | Jarnikov .......... H04N 21/23892 711/162 |
| 2013/0332971 | A1* | 12/2013 | Fisher ................ H04N 21/266 725/93 |
| 2014/0270338 | A1* | 9/2014 | Zhao ..................... G06T 1/0021 382/100 |
| 2014/0325550 | A1* | 10/2014 | Winograd ........ H04N 21/44236 725/19 |
| 2015/0063567 | A1 | 3/2015 | Robert et al. |
| 2015/0302033 | A1* | 10/2015 | Jarnikov ............... G06F 16/219 707/695 |
| 2015/0356281 | A1* | 12/2015 | Van Deventer ......... H04L 9/008 713/176 |
| 2016/0050074 | A1* | 2/2016 | Romrell ............. H04N 21/8358 713/176 |
| 2017/0118537 | A1* | 4/2017 | Stransky-Heilkron ...................... G06F 21/16 |
| 2018/0295172 | A1 | 10/2018 | Vikramaratne |
| 2018/0352307 | A1* | 12/2018 | Giladi ................ H04N 21/8358 |
| 2019/0124377 | A1* | 4/2019 | Chen ................ H04N 21/23892 |
| 2019/0356966 | A1* | 11/2019 | Zuydervelt ........ H04N 21/8352 |

OTHER PUBLICATIONS

Jarnikov et al., "A Watermarking System for Adaptive Streaming White Paper Revenue Assurance", URL: http://irdeto.com/documents/collateral/wp_disney_ieee_watermarking_system_for_adaptive_streaming.pdf, Irdeto, Feb. 28, 2014, 12 pages.

International Searching Authority, International Search Report and Written Opinion for International Application No. PCT/US2019/44761 dated Oct. 29, 2019.

* cited by examiner

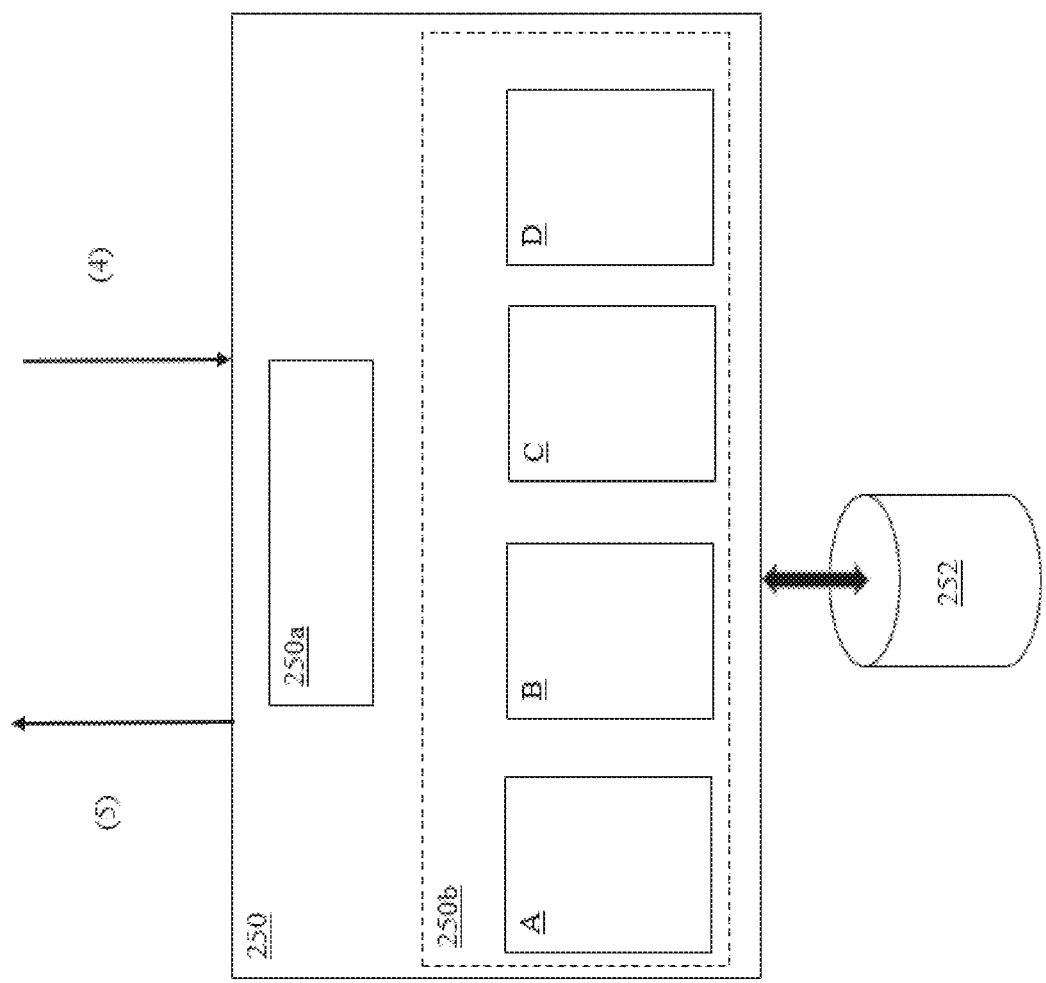

METHOD AND APPARATUS FOR SESSION-BASED WATERMARKING OF STREAMED CONTENT

BACKGROUND

A "watermark" consists of minor changes to the content made for various purposes. For example, a watermark can be in the form of an overlay identifying the owner of content and or to render the content less valuable. For example, a "proof" image having an overlay watermark can be distributed without charge to allow a potential customer to view the image before purchase. This is known as a visible watermark. Upon paying for the image, the customer will be given an image print or data file that does not include the watermark.

Watermarking can also be used to distinguish one copy of content from another. For example, unique watermarks can be applied to each copy distributed to multiple parties. The party identity can be stored in a database in association with an indication of the unique watermark of the copy distributed to that party. If copies are then redistributed in an unauthorized manner, the identity of the likely unauthorized redistributor can be ascertained based on the watermark in the unauthorized copy. This is sometimes referred to as "forensic watermarking." Such Watermarks can be digitally "embedded" in the content data in a manner that does not significantly or perceptibly change the rendered image and thus is not readily ascertainable to the redistributors. This is known as an "invisible watermark."

The original distributor can readily discern the unique watermark in each copy through an extraction algorithm, which defines the difference between the watermarked content and the original content. The extracted watermark is then correlated with all different watermarks to identify which watermark was in the content that has been distributed in an unauthorized manner. The watermark can then be correlated to the receiver to which that content was transmitted and the potential pirate can be identified. An example of such watermarking is described in U.S. Pat. Nos. 9,288,057 and 7,058,809, the disclosures of which are incorporated herein by reference.

Video streaming such as Over-the-Top (OTT) video has seen a tremendous rise in popularity due to the rapid growth in multiscreen video consumption. Also, the number and types of viewing devices has increased tremendously. Each video stream needs to be "packaged" for a particular type of viewing device environment and Content Delivery Network (CDN). Packaging of a video stream includes adding metadata which provides the required control data (or 'manifest data') to the media player and packaging the content using the appropriate protocol, DRM mechanism and the like. If there are 1,000 device types, a provider may need to create ("package" for a particular screen) and pre-store 1,000 variants for each title. This number can be multiplied by other factors such as content delivery network (CDN) and geographic distribution factors as well as regulatory requirements. To reduce overhead, the concept of Just-in-Time Packaging (JITP) has been introduced. In JITP, the content assets are stored in, for example, an HTTP-ready format, so that clients can make HTTP requests for video segments directly. When a client device connects to the JIT packager, the JIT Packager extracts the requested fragments and packages them accordingly for the client environment.

It has become common to use forensic watermarking in packaged video streams. The above-noted rise in popularity of streamed content and OTT implementations of content distribution have raised concerns of piracy of streamed content, such as live sporting events. Inserting unique watermarks into multiple streams of content, of course, raises significant technical issues that are not present in watermarking of still images for distribution. The technique of "frame-based watermarking" has become very popular. In this technique, different copies of each frame, or segment, in streamed content are created. So every frame in a video stream exists in multiple versions embedded with different watermarks. The frames can be encrypted with different keys. The video stream that is distributed will then contain multiple versions of each frame. Each receiver will be able to decrypt only one of these frames and the decrypted video stream will then contain a unique watermark. Alternatively, only one of the multiple versions is distributed to each receiver.

Frame-based watermarking has limitations when there are large numbers of receivers, such as in the live streaming of a popular sporting event. The time length required for a unique watermark for each receiver depends on the number of receivers. Increasing the number of copies of each frame can reduce the time required for a unique watermark. However, this increases the required storage resources and, in some cases transmission bandwidth.

For example, in a live sporting event streamed over the internet, the number of receivers can be in the millions. The number of copies of each frame required to create unique watermarks in pragmatically small portions of the data stream can drive storage and bandwidth requirements to be very expensive. One solution to this problem is to allow the watermarking to be accomplished at each receiver (known as "client-side watermarking"). However, this requires a secure receiver with watermarking capability. In the case of streaming to various devices over the internet, such as mobile phones and other computing devices, adequate security and/or watermarking functionality is often not available. Therefore, server-side watermarking solutions are preferred.

FIG. 1 illustrates a typical arrangement for server-side watermarking, also known as "head end" watermarking. In such a system, the watermark is embedded during the content preparation process, by the operator for example. Multiple watermarked variants are created. To uniquely mark a stream, the segments of the variants are "switched", according to a predetermined function, between the multiple variant streams marked with complimentary watermarks. The function can be, for example, a sequence or an algorithm that determines a sequence. In the example of FIG. 1, there are two distinct variants of the content 110 and 120, i.e. content segments marked with two distinct watermarks A and B.

The operator can create a unique content stream 130 by arranging content segments having A and B watermarks in a unique manner by switching the content segments between A and B type segments to create a packaged output stream 130. It can be seen that, with the limited number of streams variants, two in this example, the amount of information that can be embedded in a period of run time of the content is relatively low. Stated differently, if there are many streams 130 to be created, a large number of content segments are required to produce a unique watermark sequence for each stream. This problem can be solved by increasing the number of stream variants. However, as noted above, a large number of variants requires commensurately large storage resources. When a stream is to be broadcast to many thousands of receivers, all of which have to be uniquely identified, increasing the number of variants, and the required storage resources, can be cost prohibitive. The watermarking technique illustrated in FIG. 1 is readily adaptable to JITP. However, some of the advantages of JITP, e.g. reduced storage resources, are not realized when conventional watermarking is used because of the need to store multiple versions of the content asset for watermarking purposes.

BRIEF DESCRIPTION OF THE DRAWING

The foregoing summary, as well as the following detailed description of the invention, will be better understood when read in conjunction with the appended drawings. For the purpose of illustrating the invention, there are shown in the drawings various illustrative embodiments. It should be understood, however, that the invention is not limited to the precise arrangements and instrumentalities shown. In the drawings:

FIG. 3 is a schematic diagram of the watermark server and its operation.

DETAILED DESCRIPTION

Certain terminology is used in the following description for convenience only and is not limiting. Unless specifically set forth herein, the terms "a," "an" and "the" are not limited to one element but instead should be read as meaning "at least one." The terminology includes the words noted above, derivatives thereof and words of similar import. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The disclosed embodiments provide a method of uniquely watermarking multiple version live streams of content over a very short period of run-time of the content. The embodiments leverage existing content distribution platforms and Just-in-Time Packaging without requiring relatively large bandwidth and storage resources. To address these challenges, instead of embedding watermarks during content preparation, the watermark is embedded into each segment "on-the-fly" immediately before the stream is packaged for the requesting client, i.e. receiver.

The disclosed embodiment uses a distinct manifest file which contains a unique sequence of watermarked and unwatermarked segments (using multiple watermarks from a watermark alphabet), for the client that requested the stream. When the client requests the segment, the segment is packaged and encrypted by a Just-In-Time packager.

Figure 1:
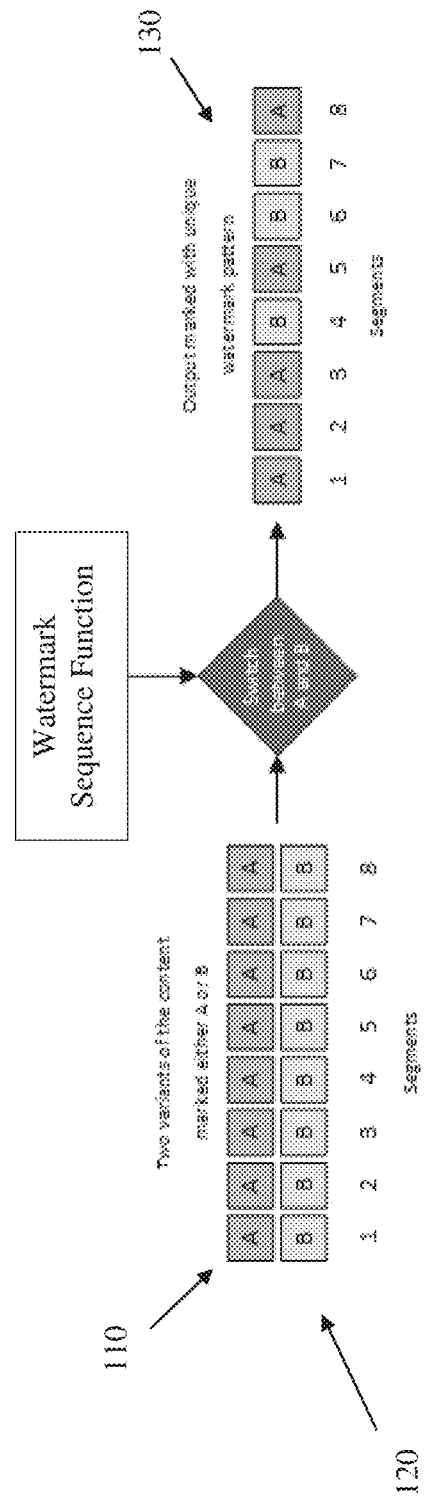
FIG. 1 is a schematic diagram illustrating a conventional watermarking process for a data stream.
Figure 2:
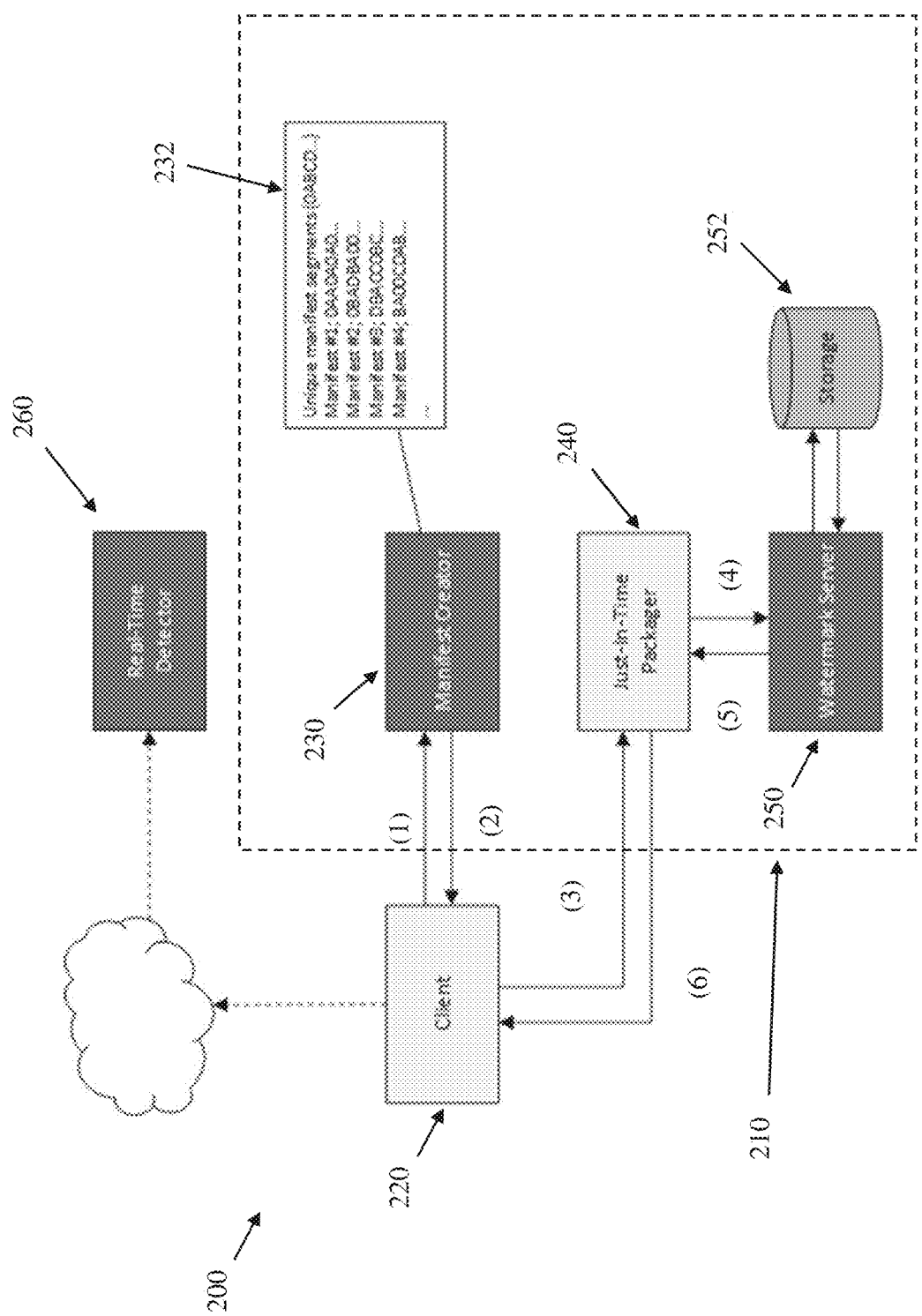
FIG. 2 is a computer architecture and flow diagram of an embodiment.

FIG. 2 illustrates a content packaging and distribution system in accordance with an embodiment. System 200 includes client 220, as a receiver, and distributor system 210. The elements of distributor system 210 can be controlled by one or more parties and can be provided to a distributor as a service by other parties. However, for the purpose of clarity, the elements of distributor system 210 are described herein as being associated with a distributor of content. Client 220 can be any type of device associated with an end user or a distributor, such as a server, a personal computer, a mobile computing device, or a set top box. Packager 240 can be a server system associated with the content distributor. Manifest file 232 is created by manifest creator 230. Manifest file 232 includes multiple unique sequences of watermarks to be applied to successive segments of respective data streams. Note that the sequence can include a "null watermark", i.e. a designation that a specific segment should not be watermarked. Each unique sequence of watermarks is associated with a prefix. For example, the first watermark in manifest file 232 of this example has the prefix "#1" and the watermark sequence of "ABBABABAABAA . . . ." Manifest creator can be a computing system associated with the distributor or a third-party service provider.

When client 220 requests a content stream (1) from distributor 210, the request is routed to manifest creator 230. Manifest creator 230 then returns, a watermark sequence (2) associated with the client ID based on manifest file 232. Manifest file 232 can be created in advance or each unique sequence can be generated after receiving a respective request for content from an authorized client device. Manifest file 232 of the embodiment contains the metadata and URLs to the segmented stream of the content but the filenames of the individual segments can be obfuscated by manifest creator 230 using known obfuscation techniques.

In order to facilitate later identification, each of the reconstructed streams for the content item should consist of a unique sequence of watermarks, using multiple watermarks, including null watermarks, from a watermark "alphabet." The request from the client can include the ID of the requested content item and a unique client ID, assigned by the operator, so that the unique sequence can be generated and recorded with the client ID for future identification purposes. Note that conventional Just-in-Time packagers often use a manifest to provide a client ID to be used with requests for content. This conventional mechanism is leveraged by the embodiment to provide a watermark sequence.

Client 220 then makes a request for each successive content segment (3) from packager 240 based on the manifest data provided to client 220 by manifest creator 230. Client 220 will parse the manifest data and request the first segment of the content according to the URL in the manifest data. In response to the request from client 220, packager 240 makes a request for the segment (4) from watermark server 250. Watermark server 250 will retrieve the unwatermarked segment from storage 252, embed the appropriate watermark based on the manifest data, and return the watermarked segment to packager 240 (5). Packager 240 will package the watermarked segment as part of a unique content stream before returning it to the client (6). In this manner, each watermark is embedded by watermark server 250 just prior to packaging of the content stream by packager 240. Each watermarked segment can be cached and returned for subsequent requests if the exact same watermarked segment is requested by another client in accordance with manifest data.

In the embodiment described herein, each client will receive a unique sequence of watermarks in a very small period of time, without the need to store multiple versions of the entire data stream. In order to determine which watermark sequence is assigned to a client, the client is assigned a unique ID, such as a number from the base-x number system (where x is the number of watermarks in the watermark alphabet+1). The assigned numbers can be shuffled using a shuffling algorithm such as the Fisher-Yates shuffle algorithm.

For example, assuming there are 6 distinct watermarks in the watermark alphabet and 1,000,000 possible client connections, the first possible watermarking sequence is 0,0,0, 0,0,0,0, A (where 0 is an unwatermarked (i.e. null watermarked) chunk and A is the first watermark in the alphabet). In this example, the last watermarking sequence, for the 1,000,000th client, is A, A,C,C,C,C,A,A.

Table 1 below illustrates this example.

TABLE 1

Watermarking sequence using 6 distinct watermarks

| Client No. | Sequence |
|---|---|
| 1 | 0, 0, 0, 0, 0, 0, 0, A |
| 2 | 0, 0, 0, 0, 0, 0, 0, B |
| . | . |
| 125 | 0, 0, 0, 0, 0, B, C, F |
| . | . |
| 47623 | 0, 0, B, E, E, E, F, B |
| . | . |
| 854300 | A, 0, A, E, E, D, D, F |
| . | . |
| 1000000 | A, A, C, C, C, C, A, A |

Packager 240 can be configured to request the segment from watermark server 250. This allows watermark server 250 to embed the watermark into the segment, if required, before returning the segment to packager 240. FIG. 3 illustrates the operation of watermarking server 250 in greater detail. As discussed above, watermark server 250 receives requests for content segment (4) and transmits watermarked content segments (5). Each request for a content segment can include manifest data indicating the watermark, in the sequence of watermarks, for that segment. The indicated watermark is selected from watermark alphabet 250b, which contains plural watermarks A, B, C, and D in this example. The selected watermark is then embedded, in any conventional manner, by embedding engine 250a into an instance of the content segment retrieved from storage 252. The watermarked instance of the content segment is then transmitted (5).

At this stage the filename can be un-obfuscated, using the inverse of the obfuscation algorithm, to allow determination, from the filename convention, if the segment should be retrieved from storage and returned with or without a watermark, i.e. a null watermark. The specific watermark can be indicated by the un-obfuscated filename and can be embedded using "chunk based watermarking" to further improve the information capacity, retain the accurate detection and address possible piracy. The chunks can be contiguous elementary streams with a duration of a couple of seconds. Multiple chunks can be aggregated into a single segment (for example a HTTP Live Streaming (HLS) segment) but a chunk remains the finest granularity element of a stream served by OTT content services which can be used to embed a single watermark.

HLS is an adaptive streaming communications protocol created by Apple to communicate with iOS and OSX devices. HLS can be used for both live and on-demand streaming. To distribute content to HLS clients, the source content is encoded into multiple files at different data rates and each is divided into short chunks, between 2-10 seconds long for example. These are loaded onto an HTTP server along with a text-based manifest file with a .M3U8 extension that directs the player to additional manifest files for each of the encoded streams.

To identify the source of distributed content, a detector, such as real-time detector 260 of FIG. 2, can be used to detect watermarks, in unauthorized content for example. This will ensure that all embedded watermarks can be quickly detected, sequenced and compared with the unique client sequence generated by the manifest creator service. The detector can be implemented as a cloud service. The detector doesn't necessary have to be used for "streaming" content but can also be used to detect watermarks in non-streaming formats such as video-on-demand (distributed using downloads, torrents, etc.). Also, the detection need not be immediate or instantaneous detection and can be effected at any time after distribution and need not be in "real time." The detector can use any type, or multiple types of extraction algorithms and detection techniques, as are compatible with the embedded watermark.

Various known watermarking techniques and algorithms can be used in connection with the invention. For example, spread-spectrum watermarking, where the marked signal is obtained by an additive modification, can used. Spread-spectrum watermarks are known to be modestly robust, but also to have a low information capacity due to host interference. Quantization type watermarks, wherein the signal is obtained by quantization can also be used. Quantization watermarks suffer from low robustness, but have a high information capacity due to rejection of host interference. Amplitude modulation watermarking, wherein the signal is embedded by additive modification in the spatial domain, can also be used.

The embodiments can be implemented by various computing devices communicating over a network, such as the Internet. The computing devices can include hardware processors and memories storing instructions which, when executed by the processors, cause the processors to carry out the disclosed functions. The architecture disclosed herein includes various devices segregated by function for the sake of clarity of description. Each device disclosed herein can include multiple devices and the devices and function can be distributed and segregated in various manners.

Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or one or more graphical processing units (GPUs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then one or more non-transient storage media and/or one or more transmission media storing or carrying the computer program form aspects of the invention. The computer program may have one or more program instructions, or program code, which, when executed by one or more processors (or one or more computing devices), carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, byte code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, and the like.

What is claimed:

1. A method for watermarking segments of a content stream to allow multiple content streams respectively associated with receivers to be distinguished from one another, the method comprising:
   (a) receiving from a receiver a request for the content stream;
   (b) in response to the request for the content stream, obtaining a watermark sequence associated with the request, the watermark sequence indicating successive watermarks to be respectively applied to successive segments of the content stream provided in response to the request;
   (c) receiving a request for a specified content segment of the content stream;
   (d) in response to receiving the request for a specified content segment of the content stream, embedding the watermark specified by the sequence in an instance of the content segment and returning, as a watermarked segment, the specified content segment with the watermark specified by the watermark sequence;
   (e) repeating steps (c) and (d) for successive content segments of the content stream; and
   (f) packaging the watermarked content segments to create the content stream.

2. The method of claim 1, further comprising transmitting the content stream to the receiver.

3. The method of claim 1, wherein the request includes receiver identification information and wherein the watermark sequence is associated with the request based on the receiver identification information.

4. The method of claim 1, wherein the watermark sequence is one of plural watermark sequences stored in a manifest.

5. The method of claim 4, wherein the watermark sequence is associated with the request based on receiver identification information in the manifest.

6. The method of claim 1, wherein the watermark sequence includes at least one null watermark.

7. The method of claim 1, wherein said returning comprises fetching a watermarked content segment from a cache.

8. The method of claim 1, wherein the watermark sequence associated with the receiver is generated in response to the request for content.

9. The method of claim 1, wherein obtaining a watermark sequence associated with the request comprises receiving the request for content from the client and returning the watermark sequence as manifest data to the client, whereby the client uses the manifest data to generate the request for a specified content segment.

10. The method of claim 1, further comprising:
    extracting at least one embedded watermark from a content stream; and determining the source of the content stream based on the extracting step.

11. A system for watermarking segments of a content stream to allow multiple content streams respectively associated with receivers to be distinguished from one another, the system comprising:
    at least one processor; and
    at least one memory operatively coupled to the at least one processor and storing computer readable instructions which, when executed by the at least one processor, cause the at least one processor to:
    (a) receive from a receiver a request for the content stream;
    (b) in response to the request for the content stream, obtain a watermark sequence associated with the request, the watermark sequence indicating successive watermarks to be respectively applied to successive segments of the content stream provided in response to the request;
    (c) receive a request for a specified content segment of the content stream;
    (d) in response to receiving the request for a specified content segment of the content stream, embedding the watermark specified by the sequence in an instance of the content segment and return, as a watermarked segment, the specified content segment with the watermark specified by the watermark sequence;
    (e) repeat (c) and (d) for successive content segments of the content stream; and
    (f) package the watermarked content segments to create the content stream.

12. The system of claim 11, wherein the content stream is transmitted to the receiver.

13. The system of claim 11, wherein the request includes receiver identification information and wherein the watermark sequence is associated with the request based on the receiver identification information.

14. The system of claim 11, wherein the watermark sequence is one of plural watermark sequences stored in a manifest.

15. The system of claim 14, wherein the watermark sequence is associated with the request based on receiver identification information in the manifest.

16. The system of claim 11, wherein the watermark sequence includes at least one null watermark.

17. The system of claim 11, wherein returning comprises fetching a watermarked content segment from a cache.

18. The system of claim 11, wherein the watermark sequence associated with the receiver is generated in response to the request for content.

19. The system of claim 11, wherein obtaining a watermark sequence associated with the request comprises receiving the request for content from the client and returning the watermark sequence as manifest data to the client, whereby the client uses the manifest data to generate the request for a specified content segment.

20. The system of claim 11, wherein the at least one embedded watermark is extracted from a content stream and wherein the source of the content stream is determined based on the at least one embedded watermark.

21. Non-transient computer readable media having instructions stored thereon for watermarking segments of a content stream to allow multiple content streams respectively associated with receivers to be distinguished from one another, the instructions, when executed by at least one processor, causing the at least one processor to:
- (a) receive from a receiver a request for the content stream;
- (b) in response to the request for the content stream, obtain a watermark sequence associated with the request, the watermark sequence indicating successive watermarks to be respectively applied to successive segments of the content stream provided in response to the request;
- (c) receive a request for a specified content segment of the content stream;
- (d) in response to receiving the request for a specified content segment of the content stream, embedding the watermark specified by the sequence in an instance of the content segment and return, as a watermarked segment, the specified content segment with the watermark specified by the watermark sequence;
- (e) repeat (c) and (d) for successive content segments of the content stream; and
- (f) package the watermarked content segments to create the content stream.

* * * * *